United States Patent
Nakazato

(10) Patent No.: US 6,475,554 B1
(45) Date of Patent: Nov. 5, 2002

(54) METHOD OF PRODUCING ELECTRODE OF NON-AQUEOUS ELECTROLYTE BATTERY

(75) Inventor: Daisuke Nakazato, Ichikawa (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/646,109

(22) PCT Filed: Mar. 24, 1999

(86) PCT No.: PCT/JP99/01515

§ 371 (c)(1),
(2), (4) Date: Sep. 25, 2000

(87) PCT Pub. No.: WO99/50920

PCT Pub. Date: Oct. 7, 1999

(30) Foreign Application Priority Data

Mar. 26, 1998 (JP) .......................................... 10-100000

(51) Int. Cl.⁷ .............................. B05D 5/12; H01M 6/14
(52) U.S. Cl. ......................... 427/58; 29/623.1; 29/623.5
(58) Field of Search .................. 427/58, 365; 29/623.1, 29/623.5; 429/209

(56) References Cited

U.S. PATENT DOCUMENTS 5,286,582 A * 2/1994 Tahara et al. ............... 429/218
5,582,623 A * 12/1996 Chu ........................... 29/623.1
6,051,338 A * 4/2000 Miyazaki et al. ........... 429/211

FOREIGN PATENT DOCUMENTS

| JP | 62283556 A | 12/1987 |
| JP | 05174818 A | 7/1993 |
| JP | 06290811 A | 10/1994 |
| JP | 07006752 A | 1/1995 |
| JP | 08124560 A | 5/1996 |
| JP | 09237623 A | 9/1997 |
| JP | 09237625 A | 9/1997 |
| JP | 09245771 A | 9/1997 |
| JP | 09293530 A | 11/1997 |

* cited by examiner

Primary Examiner—Katherine A. Bareford
(74) Attorney, Agent, or Firm—Rader, Fishman & Grauer PLLC

(57) ABSTRACT

A method for industrial and simplified production of an electrode for a non-aqueous electrolyte battery without unfavorable peeling of the electrode coating layer is provided. An electrode for a non-aqueous electrolyte battery is produced by mixing an electrode active material with a binder to prepare an electrode coating-material, applying the electrode coating-material onto an electrode collector, drying the electrode having the coating layer formed, and then carrying out aging for not less than 18 hours before or after compression-molding. The aging is preferably carried out for not less than 24 hours.

4 Claims, No Drawings

1

METHOD OF PRODUCING ELECTRODE OF NON-AQUEOUS ELECTROLYTE BATTERY

This is a national stage of PCT/JP99/01515, file Mar. 24, 1999.

TECHNICAL FIELD

The present invention relates to a method of producing an electrode for a non-aqueous electrolyte battery, and more particularly to a method of producing, with a high productivity, an electrode for a non-aqueous electrolyte battery, which electrode is excellent in mechanical strength.

BACKGROUND ART

In accordance with scale reduction and weight reduction of various electronic devices such as OA machines, VTR cameras, portable phones and the like in recent years, there is a demand for higher performance of a secondary battery used in these electronic devices. In order to meet these demands, lithium ion secondary batteries are rapidly being developed for practical use as non-aqueous electrolyte batteries having a high discharge potential and a high discharge capacity.

Each of the positive electrode and the negative electrode of a non-aqueous electrolyte battery is produced by mixing an active material with a binder to form an electrode coating-material (mixture), and applying it onto a collector, followed by drying. The battery is produced by superposing and winding up a positive electrode, a separator and a negative electrode, which are obtained in sheets, and encapsulating them together with an electrolytic solution In a battery container.

However, since a stress is imposed on the electrode at the time of winding up or encapsulating the positive electrode, the separator and the negative electrode, unfavorable peeling of the electrode coating layer is generated if the mechanical strength of the electrode is insufficient. This leads to decrease in the yield, and is a factor for higher costs.

In order to solve this problem, the peeling strength of the electrode coating layer has been conventionally increased by increasing the binder composition in the coating layer. However, increase in the binder composition naturally leads to decrease in the composition of the electrode active material in the electrode coating layer, thereby decreasing the battery capacity per unit weight.

Also, for example, in Japanese Laid-open Patent Publication No. 9-237,623/1997, the adhesiveness of the coating layer is enhanced by allowing the amount of the residual N-methylpyrrolidone (NMP) to be 50 to 500 ppm relative to the electrode weight. According to the examples in said Patent Publication, the amount of the residual NMP is adjusted by increasing the period of time for drying immediately after the application of the electrode coating-material. However, when industrial production is considered, the application and drying must inevitably be carried out in successive steps, so that in order to Increase the period of time for drying, the amount of application production per hour must be dropped, or otherwise the drying furnace must be made long and large so as to meet the amount of application production. In either case, the productivity falls.

Further, in Japanese Laid-open Patent Publication No. 7-6,752/1995, the electrodes are heated at a temperature not less than the melting point of the binder after the step of pressing the electrodes so as to prevent non-uniform distribution of the binder for improvement of the peeling strength of the coating layer. However, since a step and equipment for heating are required, the productivity falls in this case as well.

DISCLOSURE OF THE INVENTION

Object of the Invention

Therefore, the object of the present invention is to solve the above-mentioned problem of the prior art, and to provide a method for industrial and simplified production of an electrode for a non-aqueous electrolyte battery without unfavorable peeling of the electrode coating layer by a method other than heating the electrodes or drying immediately after the application.

SUMMARY OF THE INVENTION

The present inventor has made eager studies and, as a result, found out that an electrode without unfavorable peeling of the coating layer is obtained by performing aging for not less than a predetermined period of time after the electrode coating-material is applied onto an electrode collector and dried, thereby completing the present invention.

That is, the present invention is a method of producing an electrode for a non-aqueous electrolyte battery by mixing an electrode active material with a binder to prepare an electrode coating-material, applying the electrode coating-material onto an electrode collector, drying the electrode having the coating layer formed, and then compression-molding the dried electrode, wherein the method comprises carrying out aging for not less than 18 hours after the electrode is dried.

In the present invention, it is preferable that the aging is carried out after the electrode is dried, and then the electrode is compression-molded.

The production method of the electrode of the present invention can be applied to any of a positive electrode and a negative electrode.

DETAILED DESCRIPTION OF THE INVENTION

First, in the method of the present invention, a slurry-like electrode coating-material is prepared by mixing an electrode active material and a binder together with a solvent. Further, in this step, an electrically conductive agent or an additive may possibly be added in accordance with the needs.

As the electrode active material, various materials can be used without particular limitation as long as they are conventionally used as an electrode active material.

As a positive electrode active material, for example, inorganic compounds such as transition metal oxides and transition metal chalcogen compounds containing an alkali metal, conductive polymers such as polyacetylene, poly-p-phenylene, polyphenylenevinylene, polyaniline, polypyrrole, polyazulene, polyphthalocyanine, polythiophene, cross-linked polymers having a disulfide linkage, thionyl chloride and the like may be mentioned. Among these, oxides or chalcogen compounds of transition metals such as cobalt, manganese, molybdenum, vanadium, chromium, iron, copper, titanium and the like are suitable in the case of a secondary battery using a non-aqueous electrolyte solution containing a lithium salt, and $Li_xCoO_2$ ($0<x\leq1.0$), $Li_xNiO_2$ ($0<x\leq1.0$), $Li_xCo_yNi_{1-y}O_2$ ($0<x\leq1.0$, $0<y\leq1.0$), $Li_{1+x}Mn_{2-x}O_4$ ($0\leq xb \leq\frac{1}{3}$), $Li(M, Mn)_2O_4$ (M=Cr, Co, Al, B) are especially preferable in view of high potential, stability and long life.

Further, as a negative electrode active material, for example, carbonaceous materials, tin oxides and others are used. The carbonaceous materials are not particularly limited, and for example, amorphous carbon, coal cokes, petroleum cokes, vapor growth carbon fibers, hard carbon (slightly graphitizable carbon), polymer carbon, natural graphite, artificial graphite, and others may be mentioned. Among these, those skilled in the art can make a suitable choice in accordance with the intended properties of the battery. When the material is used in a negative electrode of a secondary battery using a non-aqueous electrolyte solution containing an alkali metal salt, PAN-type carbon fibers, pitch-type carbon fibers and vapor growth carbon fibers are preferable, and particularly PAN-type carbon fibers and pitch-type carbon fibers are preferable because of good doping of lithium ions.

The binder in the present invention is not particularly limited, and various binders such as conventionally used crystalline resins and non-crystalline resins can be used. For example, polyacrylonitrile (PAN), polyethylene terephthalate, polyvinylidene fluoride (PVDF), polyvinyl fluoride, fluororubber and others can be used as the binder.

The binder is used usually at an amount of 1 to 40 parts by weight, preferably 1 to 25 parts by weight, especially preferably 1 to 15 parts by weight, with respect to 100 parts by weight of the electrode active material.

The solvent is not particularly limited, and various solvents conventionally used in preparing an electrode coating-material can be used. For example, N-methylpyrrolidone (NMP), methyl isobutyl ketone (MIBK), methyl ethyl ketone (MEK), cyclohexanone, toluene and others may be mentioned.

The electrically conductive agent can be added for the purpose of complementing the electrically conductive property of the electrode active material in accordance with the needs. The electrically conductive agent is not particularly limited, and various known electrically conductive agents may be suitably used. For example, acetylene black, graphite, fine particles of gold, silver, copper and the like may be mentioned.

In addition, various known additives such as lithium carbonate, oxalic acid, maleic acid and the like can be added.

The electrode active material, the binder, the electrically conductive agent, the solvent and others can be mixed by an ordinary method. For example, they are mixed under a dry air or inert gas atmosphere by a roll mill method.

Next, the obtained slurry-like electrode coating-material is applied onto an electrode collector. The application may be carried out either on both surfaces of the collector or only on one surface in accordance with the object of the electrode. In the case of applying the electrode coating-material on both surfaces of the collector, the subsequent drying step may be carried out after the electrode material is applied simultaneously on both surfaces or alternatively a drying step may be carried out after the electrode coating-material is applied on one surface and subsequently a drying step may be carried out after the coating-material is applied on the other surface.

In the present invention, a metal foil, a metal sheet, a metal net or the like is used as the electrode collector. The metal material for the electrode collector is not particularly limited, and various metal materials that are conventionally used in electrode collectors can be used. As such metal materials, for example, copper, aluminum, stainless steel, nickel, iron, gold, platinum, titanium and the like may be mentioned; and copper, aluminum and the like are preferable. The thickness of the electrode collector to be used is usually 1 to 30 $\mu$m, preferably 5 to 20 $\mu$m.

The electrode coating-material can be applied on the electrode collector by an ordinary method. For example, the application is carried out with the use of an extrusion coat, a bar coater, a doctor knife, a wire bar or the like.

Subsequently, the electrode having the coating layer formed is dried to remove the solvent. This drying step can be carried out by an ordinary method. For example, it is dried at 110° C. for about 6 minutes. If the period of time for drying is too long, it is not preferable because then the productivity of the electrode decreases.

In the production method of the present invention, an aging step is carried out for not less than 18 hours after the electrode is dried. This aging step may be carried out before the compression-molding step, or alternatively the aging step may be carried out after the compression-molding step. It is preferable to carry out the aging step before the compression-molding step in view of eliminating the residual strain immediately after drying.

Further, in the case of carrying out the aging step after the compression-molding step, the aging step may be carried out before the step of superposing and winding the sheet-like positive electrode, separator and negative electrode after the compression-molding step, or alternatively the aging step may be carried out before the step of inserting the electrode into a battery container after the superposing and winding step. Still alternatively, the aging step can be carried out before the step of injecting the electrolytic solution after the step of inserting the electrode into the battery container. In accordance with the mode of production, those skilled in the art can suitably select and determine when the aging is to be carried out.

In the production method of the present invention, the aging is carried out for not less than 18 hours. By performing the aging step for not less than 18 hours, a practically sufficient peeling strength is obtained. It is preferable to perform this aging step for not less than 24 hours, more preferably for not less than 48 hours, and it is sufficient if the aging is carried out usually for about 96 hours in view of productivity. The aging is usually carried out at room temperature.

Further, the atmosphere of aging is not particularly limited, but it may be carried out in an air, nitrogen gas, rare gas atmosphere, or in vacuum. Air and nitrogen gas are preferable in view of productivity.

The state of the electrode during the aging may be either in a roll state or in a non-roll state. Further, if the aging is carried out in the roll state, the effect produced by the present invention is not affected whether it is an outside portion of the roll or a inside portion of the roll.

After aging or before aging, the dried electrode is compression-molded by means of a roller press to increase the density of the electrode coating-material and to adjust the thickness of the electrode to be constant.

Further, the electrode is cut to predetermined dimensions respectively in the width direction and in the longitudinal direction in accordance with the needs during the period of time after application and drying of the electrode coating-material up till incorporation of the electrode into the battery container. The cutting generally includes a slitting step of forming the electrode to have a predetermined width in the direction of production flow and a cutting step of forming it to have a desired length.

After the electrode is inserted into the battery container, the electrolytic solution is injected into the container, followed by sealing to produce a battery.

The electrolytic solution of a non-aqueous electrolyte battery using the electrode produced by the present invention may be a conventionally known electrolytic solution. As an electrolytic solution of a secondary battery which solution is composed of a non-aqueous electrolytic solution containing an alkali metal salt, propylene carbonate, ethylene carbonate, γ-butyrolactone, N-methylpyrrolidone, acetonitrile, N,N-dimethylformamide, dimethyl sulfoxide, tetrahydrofuran, 1,3-dioxolane, methyl formate, sulfolane, oxazolidone, thionyl chloride, 1,2-dimethoxyethane, diethylene carbonate, derivatives and mixtures thereof and the like may be mentioned. As the electrolyte contained in the electrolytic solution, halides, perchlorates, thiocyanates, boron fluorides, phosphorus fluorides, arsenic fluorides, aluminum fluorides, trifluoromethyl sulfates and the like of an alkali metal, particularly lithium, may be mentioned.

According to the method of producing an electrode for a non-aqueous electrolyte battery of the present invention, an electrode without unfavorable peeling of coating layer is obtained because aging is carried out for not less than 18 hours after the electrode coating-material is applied and dried on an electrode collector. The reason why the peeling strength is improved by aging is not yet made clear; however, the present inventor considers it as follows.

The thickness of the electrode coating-material immediately after application on the collector and the thickness of the electrode coating layer after evaporation of the solvent by drying are greatly different with a ratio of about 1:½. Therefore, residual strain may possibly remain in the coating layer during the drying after application. This residual strain may possibly form a site where mechanical strength is locally inferior in the electrode coating layer, and peeling may start at this site where the strength is locally inferior. Therefore, if aging is carried out after the electrode is dried, the residual strain may possibly be eliminated, and as a result, the site where the mechanical strength is locally inferior may disappear to improve the peeling strength.

MODES FOR CARRYING OUT THE INVENTION

Hereafter, the present invention will be further described in detail by way of examples; however, the present invention is not limited by these alone.

EXAMPLE 1

First, a slurry-like coating-material for a positive electrode having a composition shown in Table 1 was prepared.

TABLE 1

| Composition of coating-material for positive electrode | |
|---|---|
| LiCoO$_2$ (electrode active material) | 92 parts by weight |
| Acetylene black (electrically conductive agent) | 5 parts by weight |
| Fluororubber (binder) | 3 parts by weight |
| Methyl isobutyl ketone (MIBK) (solvent) | 45 parts by weight |
| N-methylpyrrolidone (NMP) (solvent) | 45 parts by weight |

Regarding the preparation of the coating-material for a positive electrode, 93 parts by weight of lacquer were prepared by dissolving 3 parts by weight of the binder into 90 parts by weight of a mixture solvent obtained by mixing two kinds of the solvents both in 45 parts by weight. Apart from this, 92 parts by weight of the active material and 5 parts by weight of the electrically conductive agent were mixed in dryness to prepare 97 parts by weight of a mixture powder. Next, 97 parts by weight of the mixture powder were added into 93 parts by weight of the lacquer, followed by kneading to produce a positive electrode coating-material.

Then, after the aforementioned positive electrode coating-material was applied onto one surface of an electrode collector made of aluminum foil having a thickness of 20 μm by extrusion coat, it was dried for 6 minutes in a drying furnace of 110° C. Thereafter, a similar application and drying operation was carried out on the other surface of the aluminum foil. The amount of application was the same on both surfaces, and was 27 mg in terms of the active material mass per 1 cm$^2$ of one surface.

Next, the electrode having the electrode active material layer formed on both surfaces thereof was slit into a 35 mm width and wound up in a roll form. Then, the electrode was subjected to aging in a roll state under air atmosphere at room temperature with an aging time of 24 hours.

The obtained electrode after aging was compression-molded by applying a roll press and finally the electrode was cut to a length of 165 mm. This completed an electrode for a battery, which electrode had a total thickness of 190 μm, a width of 35 mm and a length of 165 mm.

The electrode which was on the outermost circumferential portion of the roll at the time of aging was subjected to measurement of peeling strength and evaluation of the battery properties as follows.

<Measurement of Peeling Strength>

It was carried out in accordance with the T-shape peeling of JIS K 6854 (peeling bond strength test method). In other words, the electrode obtained as described above was cut out to a size of 1 cm×15 cm. Meanwhile, an adhesive tape having a width of 1 cm was prepared in a length of 15 cm. The top of the electrode piece was aligned with the top of the adhesive tape and the both were firmly bonded each other for a length of 10 cm. A paper piece for protection was stuck onto the remaining part of the adhesive tape so that the adhesive part would not be exposed.

The part of the electrode piece on which the adhesive tape is not stuck and the paper piece were respectively fixed to sample fixing parts of the tensile tester and pulled at a speed of 2.5 cm per second to determine its average tensile force as the peeling strength. During the measurement, the part of the electrode piece which was bonded to the adhesive tape was constantly kept at an angle of 90° with respect to the pulling direction.

Here, the peeling strength was determined as a relative numerical value assuming that the peeling strength of the later-mentioned Comparative Example 1 without aging was 100.

<Battery Property Evaluation>

An electrode prepared in the same manner as the electrode subjected to the measurement of peeling strength was put to evaluation of battery properties. The following negative electrode, separator and electrolytic solution were used.

(Negative Electrode)

TABLE 2

| Electrode composition for negative electrode | |
|---|---|
| Graphite (electrode active material) | 100 parts by weight |
| Acetylene black (electrically conductive agent) | 5 parts by weight |
| PVDF (binder) | 10 parts by weight |
| Oxalic dihydrate | 1 part by weight |

The coating-material for a negative electrode having a composition shown in Table 2 was applied onto both surfaces of an electrode collector made of a copper foil having a thickness of 18 μm. The amount of application was 13 mg in terms of the active material per 1 cm² of one surface. The electrode was cut and compression-molded to produce a negative electrode having a total thickness of 220 μm, a length of 168 mm and a width of 38 mm.
(Separator)
 CG#2400 manufactured by Hoechst Co., Ltd.
(Electrolytic Solution)
 Electrolyte—LiPF$_6$ 1 mol/L
 Solvent—1:1 mixed solvent of EC (ethylene carbonate)/DMC (dimethyl carbonate)

For both of the positive electrode and the negative electrode, the coating layer on one shorter side was removed with a width of 5 mm on both surfaces to expose the foil. A lead wire made of stainless steel was welded to the exposed portion of the foil. A separator was interposed between the positive electrode and the negative electrode having a lead wire welded thereon, and they were wound up. This was packed into a battery container made of resin. Further, the electrolytic solution was injected and a plug made of silicone was implemented in a state in which the lead wire was on the outside. The battery thus fabricated was subjected to a charging/discharging test shown in Table 3 to evaluate the battery properties.

TABLE 3

| Number of cycles | Charging current density (mA/cm²) | Discharging current density (mA/cm²) |
| --- | --- | --- |
| 1 | 4.64 | 4.64 |
| 2 | 16.24 | 4.64 |
| 3,4 | 16.24 | 46.43 |
| 5 and thereafter | 16.24 | 4.64 |

(Items for Property Evaluation)

High load property (%) = (charging capacity at the fourth time/charging capacity at the second time) × 100

Cycle property (%) = (charging capacity at the fiftieth time/charging capacity at the first time) × 100

EXAMPLES 2 TO 4

The same operation as in Example 1 was carried out except that the period of time for aging was changed respectively to 48 hours (Example 2), to 72 hours (Example 3) and to 96 hours (Example 4) in the production of the positive electrode.

EXAMPLES 5 TO 8

The same operation as in Examples 1 to 4 was carried out; however, the electrode which was on the innermost circumferential portion of the roll at the time of aging was subjected to the measurement of the peeling strength and the evaluation of the battery property.

Comparative Example 1

The same operation as in Example 1 was carried out except that the aging step was not carried out in the production of the positive electrode.

Comparative Example 2

The same operation as in Example 1 was carried out except that the period of time for aging was changed to 12 hours in the production of the positive electrode.

Comparative Examples 3 to 4

The same operation as in Comparative Examples 1 to 2 was carried out; however, the electrode which was on the innermost circumferential portion of the roll at the time of aging was subjected to the measurement of the peeling strength and the evaluation of the battery property.

The results of the above Examples 1 to 8 and Comparative Examples 1 to 4 are shown in Table 4 (peeling strength) and Table 5 (battery properties).

TABLE 4

| | Position at aging | Aging time | Peeling strength |
| --- | --- | --- | --- |
| Example 1 | Outermost circumferential portion | 24 hours | 115 |
| Example 2 | Outermost circumferential portion | 48 hours | 120 |
| Example 3 | Outermost circumferential portion | 72 hours | 122 |
| Example 4 | Outermost circumferential portion | 96 hours | 121 |
| Example 5 | Innermost circumferential portion | 24 hours | 115 |
| Example 6 | Innermost circumferential portion | 48 hours | 120 |
| Example 7 | Innermost circumferential portion | 72 hours | 122 |
| Example 8 | Innermost circumferential portion | 96 hours | 121 |
| Comparative Example 1 | Outermost circumferential portion | 0 hour | 100 |
| Comparative Example 2 | Outermost circumferential portion | 12 hours | 101 |
| Comparative Example 3 | Innermost circumferential portion | 0 hour | 100 |
| Comparative Example 4 | Innermost circumferential portion | 12 hours | 101 |

TABLE 5

| | Position at aging | Aging time | High load property (%) | Cycle property (%) |
| --- | --- | --- | --- | --- |
| Example 1 | Outermost circumferential portion | 24 hours | 85 | 90 |
| Example 2 | Outermost circumferential portion | 48 hours | 86 | 91 |
| Example 3 | Outermost circumferential portion | 72 hours | 86 | 91 |
| Example 4 | Outermost circumferential portion | 96 hours | 86 | 91 |
| Example 5 | Innermost circumferential portion | 24 hours | 85 | 90 |
| Example 6 | Innermost circumferential portion | 48 hours | 86 | 91 |
| Example 7 | Innermost circumferential portion | 72 hours | 86 | 91 |
| Example 8 | Innermost circumferential portion | 96 hours | 86 | 91 |
| Comparative Example 1 | Outermost circumferential portion | 0 hour | 80 | 87 |
| Comparative Example 2 | Outermost circumferential portion | 12 hours | 82 | 88 |
| Comparative Example 3 | Innermost circumferential portion | 0 hour | 80 | 87 |
| Comparative Example 4 | Innermost circumferential portion | 12 hours | 82 | 88 |

From Table 4, it is understood that the electrodes of Examples 1 to 8 of the present invention in which the aging treatment has been carried out show improvements in peeling strength as compared with the electrodes of Comparative Examples 1 to 4 in which the aging treatment has not been carried out or the aging treatment has been carried out for only 12 hours. Further, it is understood that the effect of the aging treatment is not affected by the position of the roll at the time of aging.

Furthermore, from Table 5, it is understood that the electrodes of Examples 1 to 8 show improvements in the high load property and the cycle property as compared with the electrodes of Comparative Examples 1 to 4. The reason for the improvement in the high load property seems to be that, by elimination of the residual strain, the contact between the active material and the electrically conductive agent in the coating layer is made uniform, and thereby the amount of the active material that is not in contact is reduced. The reason for the improvement in the cycle property seems to be that the amount of residual solvent is reduced by aging and the solvent amount that reacts with the electrolytic solution or the like during the cycles is reduced.

The present invention can be carried out in various other modes without departing from its spirit or principal characteristics. Therefore, the foregoing Examples are in all respects merely illustrative and must not be construed as being restrictive. Further, changes pertaining to equivalents of the scope of the claims are all comprised within the scope of the present invention.

INDUSTRIAL APPLICABILITY

As described above in detail, according to the present invention, the peeling strength of the coating layer can be improved because the residual strain in the coating layer is eliminated by performing aging for not less than 18 hours after the electrode coating-material is applied and dried on the electrode collector. Further, as additional effects, the high load property and the cycle property of the electrode are improved.

Thus, the method of the present invention is a method capable of industrial and simplified production of an electrode for a non-aqueous electrolyte battery without unfavorable peeling of the electrode coating layer and with improved battery properties.

What is claimed is:

1. A method of producing an electrode for a non-aqueous electrolyte battery by mixing an electrode active material with a binder to prepare an electrode coating-material, applying the electrode coating-material onto an electrode collector, drying the electrode having the coating layer formed, and then compression-molding the dried electrode, wherein the method comprises carrying out aging under air or nitrogen gas atmosphere at room temperature for not less than 18 hours after the electrode has dried and before an electrolytic solution is introduced into a battery container that contains the electrode.

2. The method of producing an electrode according to claim 1, wherein the aging is carried out after the electrode is dried, and then the electrode is compression-molded.

3. The method of producing an electrode according to claim 1, wherein the aging is carried out for not less than 24 hours.

4. The method of producing an electrode according to claim 1, wherein the aging is carried out under an air atmosphere.

* * * * *